United States Patent
Ehman et al.

(10) Patent No.: US 12,483,033 B2
(45) Date of Patent: Nov. 25, 2025

(54) SOLAR-ENERGY ELECTRICITY GENERATION SYSTEM WITH INTEGRATED LOAD MANAGEMENT

(71) Applicant: Watershed Geosynthetics LLC, Alpharetta, GA (US)

(72) Inventors: S. Kyle Ehman, Milton, GA (US); Michael R. Ayers, Johns Creek, GA (US)

(73) Assignee: Watershed Geosynthetics LLC, Alpharetta, GA (US)

( * ) Notice: Subject to any disclaimer, the term of this patent is extended or adjusted under 35 U.S.C. 154(b) by 448 days.

(21) Appl. No.: 17/923,308

(22) PCT Filed: May 26, 2021

(86) PCT No.: PCT/US2021/034262
§ 371 (c)(1),
(2) Date: Nov. 4, 2022

(87) PCT Pub. No.: WO2021/242863
PCT Pub. Date: Dec. 2, 2021

(65) Prior Publication Data
US 2023/0231386 A1 Jul. 20, 2023

Related U.S. Application Data

(60) Provisional application No. 63/033,648, filed on Jun. 2, 2020, provisional application No. 63/031,901, filed on May 29, 2020.

(51) Int. Cl.
*H02J 3/32* (2006.01)
*G05B 19/042* (2006.01)
(Continued)

(52) U.S. Cl.
CPC .............. *H02J 3/32* (2013.01); *G05B 19/042* (2013.01); *H02J 3/381* (2013.01); *H02S 10/20* (2014.12);
(Continued)

(58) Field of Classification Search
CPC .......... H02J 3/32; H02J 3/381; H02J 2300/24; H02J 7/35; Y02P 80/14; Y02P 90/50;
(Continued)

(56) References Cited

U.S. PATENT DOCUMENTS 9,559,521 B1 * 1/2017 King .................. H02J 9/06
10,992,250 B2   4/2021 Ayers
(Continued)

OTHER PUBLICATIONS

ISA/US, United States Patent and Trademark Office, International Search Report, PCT/US 2021/034262 (Sep. 9, 2021).
(Continued)

*Primary Examiner* — Nicholas Klicos
(74) *Attorney, Agent, or Firm* — Baker Donelson; Carl M. Davis, II

(57) ABSTRACT

An integrated load management controller for directing electrical current generated by a plurality of solar photovoltaic modules exposed to ambient light selectively through a diverter to a battery bank for storage and to a current conditioner for supply of electrical current into an electrical grid, based on a supply demand communicated by an electrical grid demand controller, for managing the generation, storage, and supply of electrical current from the solar photovoltaic modules. A method of supplying supplemental electrical current to an electrical grid servicing load center using a solar-energy electricity generation system is disclosed.

2 Claims, 2 Drawing Sheets

(51) Int. Cl.
  *H02J 3/38*    (2006.01)
  *H02S 10/20*   (2014.01)
  *H02S 40/32*   (2014.01)
(52) U.S. Cl.
  CPC ...... *H02S 40/32* (2014.12); *G05B 2219/2639* (2013.01)
(58) Field of Classification Search
  CPC .......... H02S 10/20; H02S 40/32; H02S 40/38; Y02E 70/30
  See application file for complete search history.

(56) References Cited

U.S. PATENT DOCUMENTS

| | | |
|---|---|---|
| 11,277,091 B2 | 3/2022 | Ayers |
| 2017/0338651 A1* | 11/2017 | Fishman ........... H02M 7/53875 |
| 2018/0123348 A1* | 5/2018 | Narla ........................ H02J 7/35 |
| 2018/0197253 A1* | 7/2018 | ElBsat ............... G06Q 30/0284 |
| 2018/0367090 A1 | 12/2018 | Ayers |
| 2019/0089163 A1* | 3/2019 | Wellner .................. H02J 3/381 |
| 2020/0161856 A1* | 5/2020 | Mishra ...................... H02J 3/32 |

OTHER PUBLICATIONS

ISA/US, United States Patent and Trademark Office, Written Opinion, PCT/US 2021/034262 (Sep. 9, 2021).

\* cited by examiner

SOLAR-ENERGY ELECTRICITY GENERATION SYSTEM WITH INTEGRATED LOAD MANAGEMENT

TECHNICAL FIELD

The present invention relates to electrical energy generation systems that supply electrical current to electricity transmission and distribution systems. More particularly, the present invention relates to a solar-energy electrical generation system with an integrated load management system for managing the generation, storage, and provision of a supply of electricity into the electricity transmission and distribution system.

BACKGROUND OF THE INVENTION

Electricity generation, transmission, and distribution involve interconnected networks or grids, of electricity generation stations, long distance transmission power lines, and local distribution power lines that supply electrical current to load centers. Electricity generation is generally most economical at low voltages produced by large megawatt-capacity power plants. These plants often are constructed at rural areas remote from towns and cities. Substations equipped with power transformers receive the low voltage power and step-up the voltage to a higher voltage, and then communicates the high voltage electrical current through long distance transmission lines to local area distribution grids that step-down the voltage and connect to load centers that use the electrical current. Prior to reaching the load centers, such as homes, factories, and businesses, the high voltage electrical passes through step-down transformers for providing lower voltage electricity that communicates through distribution wires to the load centers.

While large-capacity electricity generation power plants (typically, 800 megawatt (fossil fuel plants) to 2200 megawatt (nuclear fuel plants)) supply electricity to the transmission and distribution grid, there is continuing and growing interest in alternative fuel electricity-generation systems. These alternative fuel system particularly include renewal resource fuel such as water, wind, and solar. Pumped water systems have been developed for supplement of electricity into the grid to meet peak demand by load centers. Pumps operate at off-peak time to transfer water from a first reservoir to a second reservoir at a higher elevation. During peak demand periods, the water flows from the second reservoir to the first reservoir passing through turbines for generating electricity and supply into the grid for meeting peak demand.

Wind turbines rely on wind power for turning blades and generating electricity with a renewable resource. Such devices however have drawbacks including danger to birds, blade operation noise, unattractive towers dotting the landscape, and a need to have expectation of reliable blowing winds that limits available operational sites.

Solar photovoltaic systems occupy large areas of ground and generate electricity during daylight hours for supplemental supply into the electrical grid. Closed landfills and laydown areas at traditional power generation plants offer large-area sites suitable for solar photovoltaic sites. The industry however includes small capacity systems for supplying electricity to individual homes and businesses with roof-top mounted photovoltaic modules. These however still require connection to the grid for nighttime power and excess demand supply during daylight. Thus, a drawback to small-capacity solar photovoltaic systems is the need to balance generation with demand and grid operating parameters. Solar generation at traditional power plants have the advantage of being in close proximity to substation transfer into the electrical grid, but small capacity sites often are remote from industry grid connections and unused solar capacity may be lost. While battery storage provides temporary holding of generated electricity, cost and space requirements limit the usefulness and solar suffers from "use or lose" capacity issues.

Accordingly, there is a need in the art for a solar-energy electricity generation system with integrated load management for regulating the generation, storage, and provision of a supply of electricity introduced into the electricity distribution system. It is to such that the present invention is directed.

BRIEF SUMMARY OF THE INVENTION

The present invention meets the need in the art by providing a load management apparatus and method for regulating the generation, storage, and provision of a supply of electricity introduced into the electricity distribution system. More particularly, the present invention provides a solar-energy electricity generation system with integrated load management for regulating the supply of an electrical current introduced into an electricity grid, comprising a plurality of solar photovoltaic modules mounted in an array at a solar energy generation site for generation of direct current electricity upon exposure to ambient light. A battery bank for receiving and storing direct current electricity generated by the plurality of solar photovoltaic modules and a current conditioner for conditioning direct current electricity to alternating current electricity for communication to an electrical power supply grid, based on a diverter for directing the direct current electricity generated by the plurality of solar photovoltaic modules selectively to the battery bank and to the current conditioner. A local controller for selective storage of the direct current electricity generated by the plurality of solar photovoltaic modules in the battery bank or supply of alternating current electricity by the current conditioner from selectively the battery bank and the plurality of solar photovoltaic modules in response to a load demand controller communicating a demand instruction to the local controller selectively for the local controller to supply alternating current electricity to the electrical grid. The local controller manages the generation, storage, and supply of direct current electricity from the plurality of solar photovoltaic modules based on the demand instruction from the load demand controller for supply of alternating current electricity.

In another aspect, the present invention provides a method of supplying supplemental electrical current to an electrical grid servicing load centers using a solar-energy electricity generation system, comprising the steps of:

(a) mounting a plurality of solar photovoltaic modules in an array at a solar energy generation site for generation of direct current electricity upon exposure to ambient light;

(b) connecting a battery bank electrically to the array of the plurality of solar photovoltaic modules for receiving and storing direct current electricity generated by the plurality of solar photovoltaic modules;

(c) selectively diverting the direct current electricity to the battery bank or to a current conditioner for conditioning the direct current electricity to an alternating current for supply into an electrical power supply grid;

(d) providing a local controller for managing the generation and distribution of the direct current electricity generated by the plurality of solar photovoltaic modules for selective storage in the battery bank or for supply through the current conditioner as alternating current electricity to the electrical grid, said supply of alternating current electricity sourced to the current conditioner from the battery bank, from the on-demand generation of direct current electricity by the plurality of solar photovoltaic modules, and from a combination of direct current electricity from the battery bank and from the on-demand generation of electricity by the plurality of solar photovoltaic modules; and (e) communicating between the local controller and a load demand controller a power supply status and a responsive demand instruction for selectively supplying alternating current electricity from the solar energy generation system to the electrical grid, whereby the local controller manages the generation, storage, and supply of direct current electricity from the plurality of solar photovoltaic modules based on the demand instruction from the load demand controller.

Objects, advantages, and features of the present invention will become readily apparent upon a reading of the following detailed description in conjunction with the drawings.

DETAILED DESCRIPTION

Figure 1:
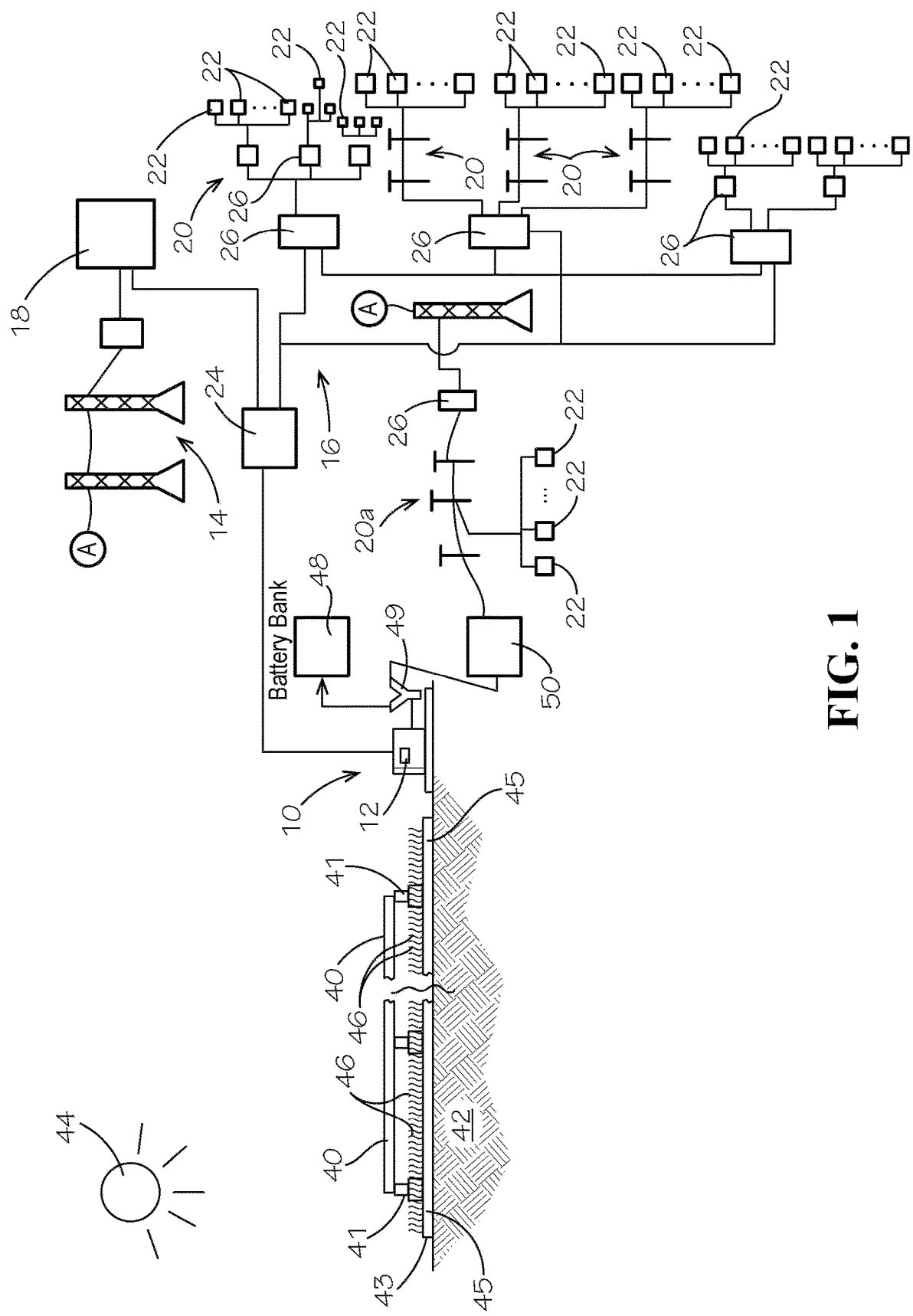
FIG. 1 illustrates a schematic diagram of a first embodiment of a solar-energy electricity generation system with an integrated load management for regulating the generation, storage, and providing a supply of electricity introduced into an electricity distribution system.

With reference to FIG. 1, the present invention provides a solar-energy electricity generation system 10 with an integrated load management controller 12 for regulating the generation, storage, and providing a supply of electricity introduced into an electricity distribution grid generally 16. FIG. 1 illustrates a first embodiment for supplemental supply of electrical current from the solar-energy electricity generation system 10 into an electricity transmission grid 14 of an integrated electric current supply system generally 16. The integrated electrical energy system 16 includes one or more electricity generation sources 10 and one or more main large capacity electricity generating plant 18. The electricity generating plant 18 (and at least one solar-energy electricity generation system 10) electrically connect to the electricity transmission grid 14 for delivery of electrical current to a plurality of electricity distribution grids 20 each providing electricity to a plurality of load centers 22 such as homes, schools, and businesses for operation of electrical devices, lighting, and machinery commonly in use today. A central operations center 24 communicates with the network of electricity sources and the transmission and distribution grids. The operations center 24 monitors demand from the plurality of load centers 22 and monitors the capacity and availability of the supply sources 10 and 18. The operations center 24 controls the supply operation of the electrical generation sources 10 and 18 and the transmission and distribution of electrical current as a supply for the demand for electricity by the load centers 22 across the power supply/usage grid 16 or network. Generally, the transmission grid 14 distributes high voltage electricity across long distances, as the electricity generation plants 18 are typically located remote from concentrated areas of load centers 22. The transmission grid 14 supplies the high voltage current to substations 26 that supply lower voltage electricity to the plurality of distribution grids 20 for serving the respective plurality of load centers 22.

The solar-energy electricity generation system 10 comprises a plurality of solar photovoltaic modules 40 that convert solar energy from the sun 44 into electrical current. The solar photovoltaic modules 40 are disposed as an array of spaced-apart modules that attach to supports 41 on a ground site 42. The illustrated system uses a woven tufted geosynthetic ground cover 43 having a woven geosynthetic sheet 45 tufted with a plurality of yarns that define tufts 46 of simulated grass. The ground cover 43 may include an impermeable geomembrane. The ground cover 43 simulates a field of grass while reducing or eliminating growth of natural plants and grasses that require maintenance.

The solar-energy electricity generation system 10 includes the local controller 12 that communicates with the operations center 24 as well as monitors the generation of electrical current by the solar photovoltaic modules 40. The local controller 12 comprises a microprocessor computer system with software instructions configured to carry out the monitoring and control of the solar photovoltaic modules 40. A battery bank 48 provides for local on-site storage of electricity generated by the plurality of solar photovoltaic modules 40. A diverter 49 operated by the local controller 12 directs the generated electricity selectively for storage in the battery bank 48 or to a current conditioner 50 for supply of the generated electricity to the electrical grid. The current conditioner 50 receives the direct current electricity from the plurality of solar photovoltaic modules 40, from the battery bank 48, or a combination of the two. The current conditioner 50 conditions the direct current electricity for supply into the electricity grid. In a first embodiment illustrated in FIG. 1, the current conditioner 50 conditions the electricity for supply as low voltage, alternating current for supply into the connected distribution grid 20a for supplemental power supply servicing its respective load centers 22.

Figure 2:
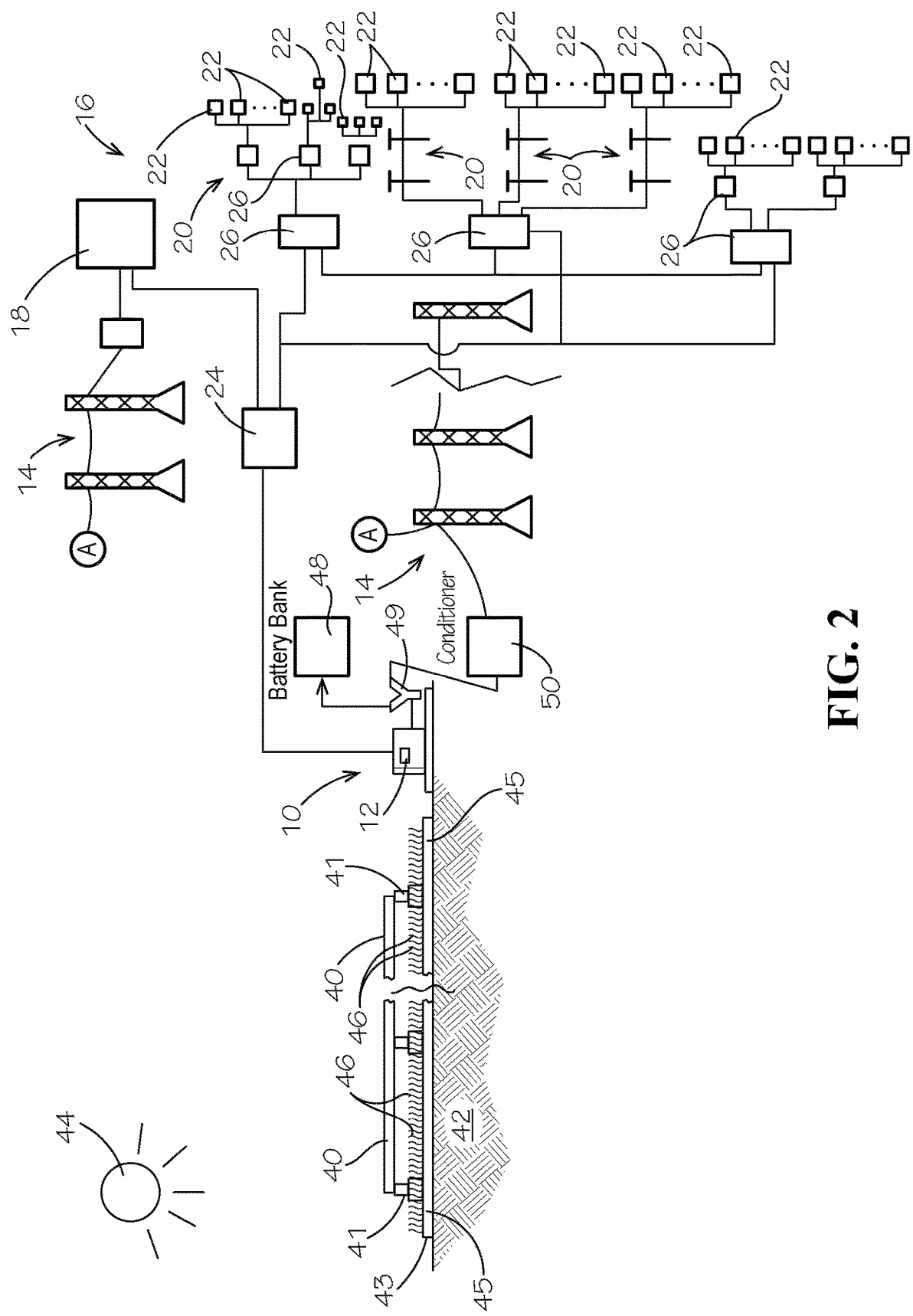
FIG. 2 illustrates a schematic diagram of a second embodiment of a solar-energy electricity generation system with an integrated load management for regulating the generation, storage, and providing a supply of the electricity introduced into an electricity transmission system.

FIG. 2 illustrates in a schematic diagram a second embodiment of the solar-energy electricity generation system 10a with the integrated load management controller 12 for regulating the supply of the generated electricity introduced into the electricity transmission grid 14. In this embodiment, the current conditioner 50 conditions the direct current electricity to high voltage alternating current for supply into the transmission grid 14. The second embodiment preferably deploys as a supplemental power source at a conventional electricity generation plant 18. This enables the solar photovoltaic energy system 10a to gainfully use conventional interconnection equipment and substation invertors for converting from low voltage direct current to high voltage alternating current communicated through the transmission grid 14.

During operation of the solar-energy electricity generation system 10, the local controller 12 communicates with the operations center 24. The operations center 24 monitors demand from the distribution grids 20 for servicing the respective load centers 22. The operations center 24 directs the generation of electricity by the sources 10 and 18 for supply into the transmission grid 14 and distribution grids 20 for supply of electrical current. The operations center 24 balances the supply demand with generation plant 18 capacity and supplemental supply from the one or more of the solar-energy supply generation systems 10. During daylight generation of electricity by the solar-energy supply generation system 10, the local controller 12 manages the communication of the generated electricity into the battery bank 48 or into the electrical grid through the diverter 49. Alternatively, the controller 12 may manage delivery of generated electricity as a combination of momentarily generated electricity together with electricity from the battery bank 48. The local controller 12 manages the production of electricity based on requirements communicated by the operations center 24 in balancing electrical supply capacity with the electrical demand of the load centers 22.

Electricity generated by the solar photovoltaic modules 40 communicates through the diverter 49 selectively into the battery bank 48 for storage or into the electrical grid 14 after conditioning by the current conditioner 50. At night-time or overcast daytime, the operational controller 24 may direct the local photovoltaic system 10a to supply current from the battery bank 48. The local controller 12 causes the current to flow from the battery bank 48 through the diverter 49 into the current conditioner 50 for converting from direct current to alternating current for supply into the respective transmission grid 14 or distribution grid 20.

During operation, the operating controller 12 periodically communicates the power supply status of the solar photovoltaic system 10 to the central operations center 24. The power supply status includes the momentary power supply capacity of the photovoltaic modules 40, the energy storage held in the battery bank 48, and the power that may be provided into the electrical grid. The operations center 24 directs the controller 12 in managing the use of the generated electricity; for example, conditioning and supply of electricity into the electrical grid 16 (transmission grid 14 or distribution grid 20, as connected), transferring of the electricity into the battery bank 48, or a combination, based on electrical demand from load centers 22 serviced by the distribution networks 20 and supply of electricity generated by the at least one power generation plant 18 and the at least one supplemental solar photovoltaic energy generation system 10. The operations center 24 balances the demand and supply, and the load demand controller communicates supply instructions to the operating controller 12.

The operating controller 12 manages the supply of electricity from the solar energy generation system 10 (generated or supplied from battery 48) into the electrical grid based on the supply instruction. The involves the operating controller 12 balancing the current supplied into the electrical grid with the momentarily generated current of the solar generation system 10 and the current from the battery bank 48. The operating controller 12 adjusts the source of the supplied current using the as-generated current and the battery current, because the as-generated current may vary based on ambient atmosphere conditions of clouds and varying solar energy directed onto the solar photovoltaic modules.

The operating controller 12 reports, as noted above, the power supply status to the central operations center 24. The demand controller of the central operations center evaluates such power supply status from the one or more solar energy generation systems 10, and the power supply status communicated by the power generation plant 18, and other on-line or standby supplemental energy systems such as solar or other fuel source energy supply system, to balance electrical current supply with demand. The operations center 24 periodically communicates a responsive demand instruction to the operating controller 12, or other on-line operating controllers, for selectively supplying supplemental electrical current to the electrical grid.

The local load management controller 12 at each solar photovoltaic energy generation station 10 communicates with the electrical grid controller 24. The local load management controller 12 manages the electricity that is generated by the solar photovoltaic energy generation station 10. The load management controller 12 directs the generated electricity: (i) into the battery bank 48, (ii) into the electrical grid (14 or 20, as connected), or (iii) combination into the battery bank and the electrical grid. The load management controller 12 provides supplemental electricity into the electrical grid using: (i) power stored in the battery bank 48 or (ii) combination of electricity sourced from the battery bank 48 and the electricity generated with the solar photovoltaic modules 40, based on instructions for supply of electricity requested from the electrical grid controller 24.

In an exemplary embodiment, the load management controller 12 communicates the power supply status of the solar photovoltaic generation system 10 to the electrical grid controller 24. As noted above, the power supply status includes the momentary power supply capacity of the photovoltaic modules 40, the energy storage held in the battery bank 48, and the power that may be provided into the electrical grid. The electrical grid controller 24 uses this status information to assess supply for electricity available from the one or more solar photovoltaic energy generation systems 10 and the one or more power plants 18 within the electrical grid in view of demand from the load centers, and other standby electric current supplier available for servicing the grid demand for electrical current. The electrical grid controller 24 communicates with the load management controller 12 a confirmation of a load supply to be provided by the solar photovoltaic generation system 10. The load management controller 12 directs the generated electricity into the electrical grid and surplus energy if any is directed into the battery bank 48.

The deliverable capacity of the solar photovoltaic generation system may change based on changes in ambient conditions. The deliverable capacity may decrease, for example, by a cloud that passes over the generation site blocking or reducing solar radiation received by the solar photovoltaic modules 40 or the solar radiation angle changes as the earth rotates relative to the sun. These ambient changes may decrease the generation of electricity for supply to the electrical grid. The load management controller 12 however supplements the decreased generation of electricity (the instructed delivery amount less a reduction due to ambient changes) with electricity from the battery bank 48, so that the local site continues to feed the directed kilowatts into the electrical grid. The local load management controller 12 also communicates to the electrical grid controller 24 the status showing that the generation capacity of the solar energy generation system 10 is now reduced. As noted above, the status information includes the amount of generation capacity, the battery bank supply capacity, and the deliverable electricity. The electrical grid controller 24 receives the periodic power status information, and continually periodically evaluates the system capacity information from other of a plurality of solar photovoltaic generation systems 10 if integrated into the electrical grid and the power plants 18 that are on-line, and balances supply and sources of available capacity with demand from distribution grids 20 servicing the load centers 22.

Similarly, ambient changes may increase the generation capacity of the solar energy generation system 10, and to local load management controller 12 also communicates to the electrical grid controller 24 the status showing that the generation capacity is now increased. The local load management controller 12 manages the surplus generated electricity by directing the surplus into the battery bank 48 while continuing to supply the instructed capacity. The electrical grid controller 24 however receives the generation status of the solar photovoltaic system 10 and may in response increase the delivery requirement for the solar photovoltaic system 10 to meet load center demand.

The present invention gainfully may be deployed on large area ground sites such as closed landfills or lay-down waste sites at power plants, but compact systems may be readily deployed in small area sites (less than one acre or larger) for supplemental supply into the local transmission or distribution grid. Thus, more than one compact solar photovoltaic energy generation system may be installed in different areas and integrated with the electricity transmission and distribution system as disclosed herein for supply of electricity to meet demand from the plurality of load centers across the electric services grid.

The present invention accordingly provides a solar-energy electricity generation system with integrated load management for regulating the supply of the electricity introduced into the electricity distribution system. The solar-energy electricity generation system comprises:
 a plurality of solar photovoltaic modules mounted in an array;
 a battery bank for receiving and storing direct current electricity generated by the plurality of solar photovoltaic modules in response to exposure to ambient light;
 a current conditioner for conditioning direct current to alternating current for communication to an electrical power supply grid;
 a diverter for directing electricity generated by the plurality of solar photovoltaic modules selectively to the battery bank and to the current conditioner;
 a local controller for selective storage of electricity generated by the plurality of solar photovoltaic modules in the battery bank or for supply of electricity from either the battery bank or at demand generation by the plurality of solar photovoltaic modules; and
 a load demand controller communicating a demand instruction to the local controller selectively for the local controller to supply electrical current to an electrical grid,
 whereby the local controller manages the generation, storage, and supply of electricity from the plurality of solar photovoltaic modules based on the demand instruction from the load demand controller.

In another aspect, the present invention provides a method of supplying supplemental electricity to an electrical grid using a solar-energy electricity generation system, comprising the steps of:
 (a) mounting a plurality of solar photovoltaic modules in an array for exposure to ambient light;
 (b) connecting a battery bank electrically to the array of the plurality of solar photovoltaic modules for receiving and storing direct current electricity generated by the plurality of solar photovoltaic modules in response to exposure to ambient light;
 (c) selectively diverting the direct current electricity to the battery bank, to a current conditioner for conditioning the direct current electricity to an alternating current for supply into electrical power supply grid;
 (d) providing a local controller for managing the generation and distribution of electricity generated by the plurality of solar photovoltaic modules for selective storage of the direct current electricity generated by the plurality of solar photovoltaic modules in the battery bank or for supply of electricity to an electrical grid said supply of electricity from the battery bank, from the on-demand generation of electricity by the plurality of solar photovoltaic modules, and from a combination of electricity from the battery bank and from the on-demand generation of electricity; and
 (e) communicating between the local controller and a load demand controller a power supply status and a responsive demand instruction for selectively supplying electricity to the electrical grid,
 whereby the local controller manages the generation, storage, and supply of electricity from the plurality of solar photovoltaic modules based on the demand instruction from the load demand controller.

The forgoing has disclosed operative embodiments of solar energy generation systems in combination with an electrical supply grid (transmission or distribution) serviced by other power generation plants or systems, with an integrated load management controller for managing the generation, storage, and provision of a supply of electrical current into the electrical grid servicing load centers through transmission and distribution grids. While this invention has been described with particular reference to certain embodiments, one of ordinary skill may readily appreciate that variations and modifications can be made without departing from the spirit and scope of the invention as recited in the appended claims.

What is claimed is:
1. An electricity generation, transmission, and distribution system with integrated load management for regulating a supply of a supplemental electrical current introduced into an electricity transmission and distribution grid for supply of electrical current to a plurality of load centers, comprising:
 an electricity generating source that supplies alternating current electricity to an electricity transmission and distribution grid of a high voltage transmission network and a low voltage distribution network communicating electricity to a plurality of load centers each having a respective demand for electrical current; and
 a supplemental electricity generation system for selective supply of a supplemental electrical current into the electricity transmission and distribution grid, comprising:
 a plurality of solar photovoltaic modules mounted in an array at a solar energy generation site for generation of direct current electricity upon exposure to ambient light;
 a battery bank for receiving and storing direct current electricity generated by the plurality of solar photovoltaic modules;
 a current conditioner for conditioning direct current electricity from (a) the plurality of solar photovoltaic modules and (b) the battery bank to alternating current electricity for communication to the electricity transmission and distribution grid; and
 a diverter for directing the direct current electricity generated by the plurality of solar photovoltaic modules selectively to the battery bank and to the current conditioner;
 characterized by a local controller for selective (i) storage of the direct current electricity generated by the plurality of solar photovoltaic modules in the battery bank or (ii) supply of alternating current electricity by the current conditioner selectively from (a) the battery bank and (b) the plurality of solar photovoltaic modules; and a load demand controller communicating a demand instruction to the local controller selectively for the local controller to supply alternating current electricity to the electricity transmission and distribution grid based on aggregated demand of the load centers for electricity and a power supply status of the supplemental electricity generation system, whereby the local controller manages (i) the generation and storage of direct current electricity from the plurality of solar photovoltaic modules and (ii) the supply of conditioned alternating current based on the demand instruction from the load demand controller.

2. A method of regulating a supply of supplemental electrical current to an electricity transmission and distribution grid of an electricity generation, transmission, and distribution system servicing a plurality of load centers each with a respective demand for a supply of electricity, said electricity generation, transmission, and distribution system comprising an electricity generating source that supplies alternating current electricity to an electricity transmission and distribution grid of a high voltage transmission network and a low voltage distribution network communicating electricity to a plurality of load centers each having a respective demand for electrical current; and a supplemental electricity generation system for selective supply of a supplemental electrical current into the electricity transmission and distribution grid, comprising:

a plurality of solar photovoltaic modules mounted in an array at a solar energy generation site for generation of direct current electricity upon exposure to ambient light;

a battery bank connected electrically to the array of the plurality of solar photovoltaic modules for receiving and storing direct current electricity generated by the plurality of solar photovoltaic modules;

a current conditioner for conditioning direct current electricity from (a) the plurality of solar photovoltaic modules and (b) the battery bank to alternating current electricity for communication to the electricity transmission and distribution grid; and a diverter for directing the direct current electricity generated by the plurality of solar photovoltaic modules selectively to the battery bank and to the current conditioner;

said method characterized as comprising the steps of:

(a) generating direct current electricity with the plurality of solar photovoltaic modules in then array at the solar energy generation site upon exposure to ambient light;

(b) selectively diverting the direct current electricity (i) to a battery bank for storage or (ii) to the current conditioner for conditioning the direct current electricity to an alternating current for supplemental supply into the electricity transmission and distribution grid;

(c) managing with a local controller the generation and distribution of the direct current electricity generated by the plurality of solar photovoltaic modules for selective storage in the battery bank or for supply through the current conditioner as alternating current electricity to the electricity transmission and distribution grid, (d) sourcing said supply through the current conditioner based on a load demand instruction, said supply of alternating current electricity sourced from the battery bank, from the generation of direct current electricity by the plurality of solar photovoltaic modules, and from a combination of direct current electricity from the battery bank and from the generation of electricity by the plurality of solar photovoltaic modules; and (e) communicating between the local controller and a load demand controller a power supply status of the supplemental electricity generation system and a responsive demand instruction from the load demand controller for selectively supplying alternating current electricity from the supplemental electricity generation system to the electricity transmission and distribution grid in response to an aggregated demand of the plurality of load centers, whereby the local controller manages the generation and storage of direct current electricity from the plurality of solar photovoltaic modules and the supply of conditioned alternating current based on the load demand instruction from the load demand controller.

* * * * *